United States Patent
Schiller et al.

(10) Patent No.: US 7,043,139 B1
(45) Date of Patent: May 9, 2006

(54) METHOD FOR ADDRESSING A BITSTREAM RECORDING

(75) Inventors: Harald Schiller, Hannover (DE); Heinz-Werner Keesen, Hannover (DE); Marco Winter, Hannover (DE)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 09/786,691

(22) PCT Filed: Aug. 30, 1999

(86) PCT No.: PCT/EP99/06377

§ 371 (c)(1),
(2), (4) Date: Mar. 7, 2001

(87) PCT Pub. No.: WO00/14744

PCT Pub. Date: Mar. 16, 2000

(30) Foreign Application Priority Data

| Sep. 7, 1998 | (EP) | 98250315 |
| Nov. 4, 1998 | (EP) | 98250387 |
| Jun. 8, 1999 | (EP) | 99250179 |
| Jul. 1, 1999 | (EP) | 99250214 |

(51) Int. Cl.
*H04N 5/91* (2006.01)
(52) U.S. Cl. .................. 386/95; 386/126
(58) Field of Classification Search ........... 386/46, 386/68, 95, 112, 125, 126
See application file for complete search history.

(56) References Cited

U.S. PATENT DOCUMENTS

| 5,630,005 A | 5/1997 | Ort ........................ 386/69 |
| 5,999,698 A * | 12/1999 | Nakai et al. ............. 386/125 |
| 6,091,674 A * | 7/2000 | Tozaki et al. ........... 369/30.04 |

FOREIGN PATENT DOCUMENTS

| EP | 673 034 A2 | 9/1995 |
| EP | 729 153 A2 | 8/1996 |
| EP | 797 204 A2 | 9/1997 |
| FR | 2 759 471 | 8/1998 |

* cited by examiner

*Primary Examiner*—Huy Nguyen
(74) *Attorney, Agent, or Firm*—Joseph J. Laks; Frank Y. Liao; Ronald Kolczynski

(57) ABSTRACT

In bitstream recording presentation data is organized into Video Object Units. These have a variable size but have also a variable duration. To allow access to any Video Object Unit in the bitstream a mapping list is used which is based on pieces of the bitstream of constant size per piece. The mapping list additionally contains for each of these pieces a specific delta duration which indicates the difference between the arrival time of the first packet of a piece and the arrival time of the packet following immediately the last packet of that piece, and contains an initialization value which allows to have a share of equal bits between a predetermined amount of MSBs of application time stamps and the same amount of LSBs of the summation of said delta time durations. The computation of the target SOBU address includes accumulating the initialization value and the delta durations until the given time value is most closely reached towards the target SOBU then multiplying the running index of this table entry by the constant piece size directly resulting in the address value to be accessed.

6 Claims, 4 Drawing Sheets

METHOD FOR ADDRESSING A BITSTREAM RECORDING

This application claims the benefit under 35 U.S.C. § 365 of International Application PCT/EP99/06377, filed Aug. 30, 1999, which was published in accordance with PCT Article 21(2) on Mar. 16, 2000 in English, and which claims the benefit of EPO Application No. 98250315.3, filed Sep. 7, 1998, EPO Application No. 98250387.2, filed Nov. 4, 1998, EPO Application No. 99250179.1, filed Jun. 8, 1999 and EPO Application 99250214.6, filed Jul. 1, 1999.

The invention relates to a method and to an apparatus for addressing a bitstream to be recorded or being recorded on a storage medium, e.g. an optical disc.

BACKGROUND

Field of the Invention

In bitstream recording one is free to subdivide the bitstream into sub-units of more regular structure. Presentation data in DVDs (digital video or versatile disc) is organised into units called Video Object Unit, denoted VOBU, or Stream Object Unit, denoted SOBU, e.g. in the DVD VR Specification for DVD Video Recording in which the units are called VOBUs. VOBUs have a variable size (data amount measured in number of sectors), but have also a variable duration (measured in number of video fields). SOBUs have a constant size, but have also a variable duration.

For data retrieval from the disc the DVD VR specification foresees a 'VOBU map' which is a table where for every VOBU a recording the length in sectors and the duration in fields is entered. EP-A-0 729 153 discloses a table that is used for trick play mode, in which table a time code is assigned to each sector on an optical disc suited for variable transfer rate.

SUMMARY OF THE INVENTION

A table for data retrieval from a storage medium can be based on bitstream data being subdivided into pieces of constant duration. 'Duration' means the difference between the arrival time of the first packet of a piece and the arrival time of the packet following immediately the last packet of that piece.

'Housekeeping' in the general context of either DVD VR recording or Stream recording is the task to translate a given time value (presentation time in case of DVD VR recording or packet arrival time in case of Stream recording) into a disc address value where the desired data can be found.

In such systems the VOBU or SOBU map or 'mapping list', denoted MAPL, can contain a specific size or a specific offset or a specific delta size or, in general, a specific address-like quantity for each of these constant-duration pieces. By storing delta values instead of the total duration at a current VOBU or SOBU these entries can be described with shorter word length which helps to keep the total MAPL in a reasonable size.

A possible type of housekeeping process for these systems could include the following steps:
By division and truncation, calculate from the given time value the index of the mapping list entry to be looked up.
The content of the mapping list entry either directly specifies the address value to access, or all mapping list entries up to that index have to be accumulated to get the address value to be accessed.

The big disadvantage of such type of MAPL which is based on constant-duration pieces lies in the following:
In case of a low bitrate recording the pieces of constant duration will be small in size, i.e. every piece will comprise a few data sectors only or, in the extreme, a fraction of a data sector only. The disc can contain enormous numbers of those pieces, so that the MAPL may become too big to be kept in the memory.
In case of high bitrate recording, the pieces of constant duration are big in size, i.e. each piece will comprise many data sectors. Then, addressing one piece or another corresponds to a very coarse addressing on the (sector) scale, i.e. a piece address derived from the MAPL can be located many sectors away from the currently desired location.

Therefore housekeeping based on constant-duration pieces can result in a too big MAPL in some cases (up to one half of the disc capacity), and can result in too coarse addressing in other cases.

It is one object of the invention to disclose a method for assigning to a given time value a storage medium address value which method avoids such disadvantages. This object is achieved by the method disclosed in claim 1.

According to the invention the mapping list MAPL is based on pieces of constant length or size, i.e. a constant number of bits per piece.

In a medium like DVD-RAM where data are physically organised into 'ECC blocks' (ECC: error correction code) of 32 kByte length each, particular advantages result if the above constant size or a multiple of it is used as the constant size of a piece. However, any other constant size can be used. In this case of pieces of constant size the MAPL contains for each of these pieces of constant size a specific absolute duration or, preferably, a specific delta duration which indicates the arrival time of the first packet of a piece and the arrival time of the packet following immediately the last packet of that piece.

The housekeeping process, i.e. the computation of the target VOBU or SOBU address includes the following steps:
Accumulate the delta durations contained in the MAPL until the given time value is most closely reached towards the target VOBU or SOBU, i.e. until the sum of delta durations is less than or equal to the given time value and the result after addition of the next delta duration is greater than the given time value assuming that forward scanning of the VOBU or SOBU entries is performed, or until the sum of delta durations is greater than the given time value assuming that backward scanning of the VOBU or SOBU entries is performed.
The running index of this mapping list entry multiplied by the constant piece size directly results in the address value to be accessed.

The advantages of the inventive constant-size based MAPL are:
the MAPL size does not depend on the bitrate of the recordings,
the MAPL addressing accuracy is constant, the granularity basically corresponds to the 'piece size constant' which can be chosen as appropriate to be constant for all types of discs, to be constant per disc, or to be constant per recording on a specific disc.

Advantageously, the address table contains an additional initialising value to initialise the accumulation of the delta time durations.

In principle, the inventive method is suited for addressing a bitstream to be recorded or being recorded on a storage medium, e.g. a DVD recorder, wherein an address table is used that is based on pieces of said bitstream, and wherein:

said pieces each include a constant amount of bits of said bitstream;

using a running index, to each address table entry for said pieces, in particular to each address table entry except the one having the highest index, a delta time duration is assigned in said address table;

the address table contains in addition an initialisation value which allows to have a share of equal bits between a predetermined amount of MSBs of application time stamps and the same amount of LSBs of said delta time durations;

in order to get an address value for reaching a target address said initialisation value and all delta time durations up to the nearest time duration corresponding to said address value become accumulated and the running index corresponding to the delta time duration entry related to said nearest time duration becomes multiplied by said constant amount in order to compute said address value.

Advantageous additional embodiments of the inventive method are disclosed in the respective dependent claims.

BRIEF DESCRIPTION OF THE DRAWINGS

Embodiments of the invention are described with reference to the accompanying drawings, which show in.

DETAILED DESCRIPTION

Figure 1:
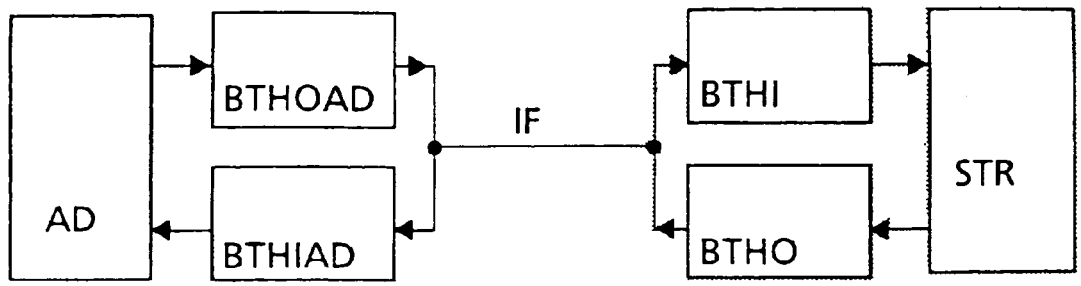
FIG. 1 simplified overall system for DVD Stream Recording.

The DVD VR stream recording system is designed to use rewritable DVD discs for recording existing digital bitstreams, editing them and playing them back as bitstreams.

The following abbreviations are used:

AP: Application Packet, APAT: Application Packet Arrival Time, ATS: Application Timestamp, IAPAT: Incremental APAT (delta values with 12 bit resolution), LB: Logical Block, LSBs: least significant bits, MAPL: Mapping List, MSBs: most significant bits, MTU_SHFT: Mapping Time Unit Shift (an unsigned integer value, e.g. 18), PAT: Packet Arrival Time, RBN: relative byte number, RBP: relative byte position, RLBN: relative logical block number, SCR: system clock reference, SOB: Stream Object, SOBU: Stream Object Unit, SOB_E_APAT: APAT of the last AP of the SOB, SOB_S_APAT: APAT of the first AP of the SOB, SOBU_S_APAT: APAT of the first AP of the SOBU, STB: set top box, SUM_IAPAT=Summation of IAPAT values, TOC: table of content.

This system is designed to satisfy the following requirements:

A timing mechanism, i.e. a time stamp is added to every broadcast packet to enable proper packet delivery during playback.

To enlarge the fields of applications, non-real-time recording should be possible. However, in this case the STB has to generate the Time Stamp information.

Data allocation strategy and file support real-time stream recording.

Many digital services require Service Information which normally is embedded in the real-time stream. To support a STB fed by data from a DVD player, the DVD should provide additional space, which can be used by the STB to duplicate part of the service information and to add additional TOC information.

Copy Protection must be supported. In addition, any scrambling performed by the service provider or the STB must be kept unchanged.

User requirements can be grouped into requirements for recording, requirements for playback, and requirements for editing:

Real-Time Recording

The system should be designed to enable real-time recording of digital streams. It also should allow the user to concatenate recordings, even if those recordings consist of different stream formats. If recordings are concatenated, a seamless or close to seamless playback possibility would be nice but is not required.

Navigation Support

To support navigation two pieces of information (lists) should be generated during recording:

1) An 'original' version of a play list. This list contains quite low level information, e.g. time map or (broadcast) packet order of the recording. This list is accessible by the STB and the content is understood by the DVD streamer as well as by the STB. In its original version the playlist enables the playback of a complete recording. The playlist may be accessed and extended after recording by the STB to allow more sophisticated playback sequences.

2) The second piece of information, a mapping list, is generated to support the stream recorder to retrieve packet stream chunks (cells), that are described in terms of the application domain, e.g. 'broadcast packets' or 'time'. This list is owned and understood by the DVD streamer only.

Content Description

The system should reserve space which can be used by the STB to store high level TOC and Service Information. This information is provided for the user to navigate through the content stored on disc and may contain sophisticated GUI information. The content needs not to be understood by the stream recorder. However a common subset of the TOC information, e.g. based on a character string, may be useful to be shared between STB and DVD, in order to enable the stream recorder to provide a basic menu by itself.

Playback of individual recording and playing all recordings sequentially should be possible via play list.

Player Menus for Entry Point Selection

The STB can generate a sophisticated menu based on the TOC information stored on the disc. However, it should be possible to generate a simple menu by the streamer itself, e.g. via some 'character' information which is shared by STB and DVD.

Trick Play Modes

The STB should be able to steer trick play via the 'play list'. Due to the nature of the broadcast stream, the trick play features may be limited to basic ones, e.g. Time Search and Title Jump.

User defined playback sequence features like programming or parental control can be supported via the play list The DVD streamer should create the 'original version' of the play list. It also should allow extensions and modifications of the play list by the STB for more sophisticated playback features. The DVD streamer is not responsible for the content of those sophisticated playlist(s).

The system must support the deletion of single recordings on user's request. If possible, the system should allow this feature under the control of the STB. The system may support insert editing.

In the simplified overall system of FIG. 1 an application device AD interacts via an interface IF, e.g. an IEEE1394 interface, with a streamer device STRD, i.e. a DVD recorder. A streamer STR within STRD sends its data via output buffering & timestamping handling means BTHO to IF and receives from IF data via input buffering & timestamping handling means BTHI. AD sends its data via output buffering & time-stamping handling means BTHOAD to IF and receives from IF data via input buffering & timestamping handling means BTHIAD.

Concerning the directory and file structure, the organisation of Stream Data and Navigation Data of DVD Stream Recording is done in a specific way such as to take into account the following:

Any DVD Streamer device STRD has certain requirements to store its own mapping list or Streamer-specific navigation data on the disc. These data are solely for helping the retrieval of recorded data; they need not be understood or even be visible to any outside application device AD.

Any DVD Streamer device STRD needs to communicate with the application device AD it is connected to. This communication should be as universal as possible so that the maximum possible range of applications can be connected to the Streamer. The Navigation Data to support such communication are called Common navigation data and must be understandable by the Streamer as well as by the application device.

The Streamer device STRD should offer to the connected application device AD a means for storing its own private data of any desired kind. The Streamer needs not to understand any of the content, internal structure, or meaning of this Application-specific navigation data.

Figure 2:
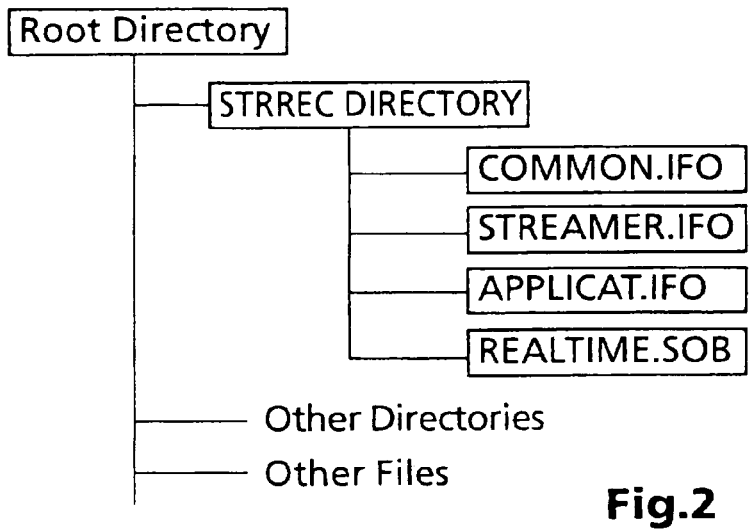
FIG. 2 basic directory and file structure.

FIG. 2 illustrates a possible directory and file structure where all the data comprising the disc content are. The files storing the disc content are placed under the STRREC directory which is under the root directory. Under the STRREC directory the following files are created:

COMMON.IFO

Basic information to describe the stream content. Needs to be understood by the Application Device as well as the Streamer.

STREAMER.IFO

Private stream object information specific to the Streamer Device. Needs not to be understood by the Application Device.

APPLICAT.IFO

Application Private Data, i.e. information that is specific to the Application(s) connected to the Streamer. Needs not to be understood by the Streamer.

REALTIME.SOB

Recorded real-time stream data proper.

Note that except for the files described above, the STR-REC directory shall not contain any other files or directories.

Figure 3:
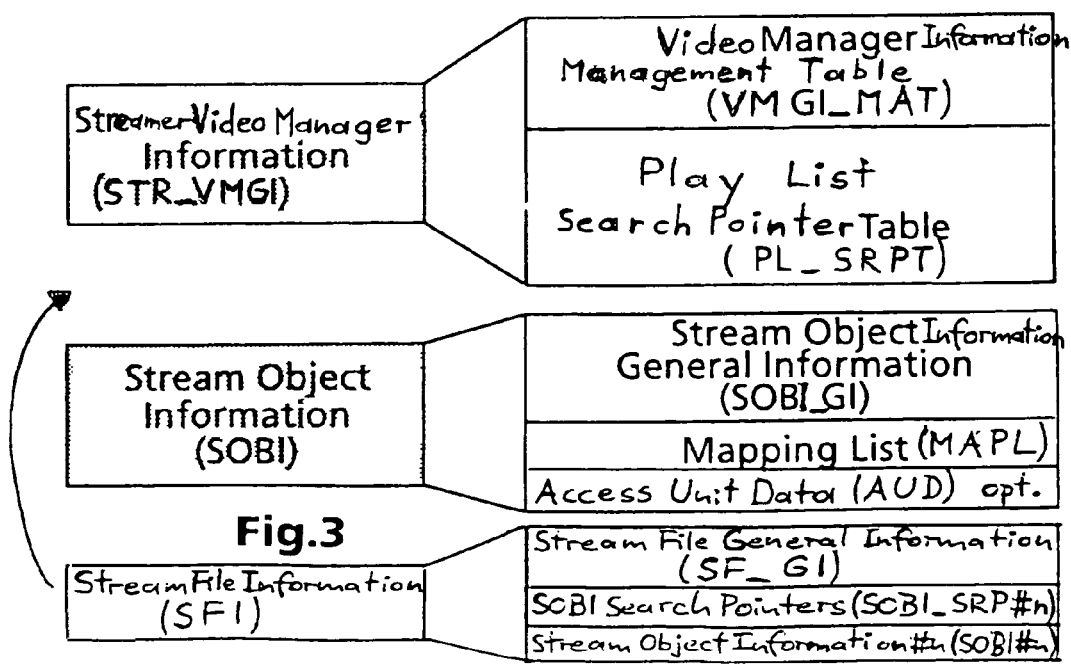
FIG. 3 navigation data structure.

Concerning the navigation data structure, Navigation data is provided to control the recording, playing back, and editing of any bitstreams that are recorded. As shown in FIG. 3, Navigation Data includes Streamer Video Manager Information (STR_VMGI) as contained in the file named COMMON.IFO and Stream File Information (SFI) as contained in the file named STREAMER.IFO. From the point of view of the Streamer Device, these two kinds of information are sufficient to perform all necessary operations.

In addition to these, DVD Stream Recording also foresees the possibility of reserving a storage location for Application Private Data APD_MG, which may in general also be considered as Navigation Data.

STR_VMGI and SFI are the Navigation Data which are directly relevant for the Streamer operation. STR_VMGI includes two kinds of information tables, namely Video Manager Information Management Table (VMGI_MAT) and Play List Search Pointer Table (PL_SRPT), in this order. SFI includes three kinds of information tables, namely Stream File General Information (SF_GI), SOBI Search Pointers #n (SOBI_SRP#n) and all Stream Object Information #n (SOBI#n), in this order. There is no restriction in Stream Recording that each table within Navigation Information must be aligned with a sector boundary.

VMGI_MAT includes information items like end address of Streamer Information (STRI), end address of STR_VMGI, start address of Stream File Information Table (SFIT), start address of Original Program Chain Information (ORG_PGCI) and start address of User Defined Program Chain Information Table (UD_PGCIT).

PL_SRPT includes information items like Number of Playlist Search Pointers, end address of PL_SRPT, Program Chain numbers of Playlist Information, Playlist Create Time and Primary Text Information.

Stream Object Information General Information (SOBI_GI) includes information items like SOB Type (SOB_TY), SOB Recording Time (SOB_REC_TM), SOB Stream Information Number (SOB_STI_N), Access Unit Data Flags (AUD_FLAGS), SOB Start APAT (SOB_S_APAT), SOB End APAT (SOB_E_APAT), first SOBU of this SOB (SOB_S_SOBU), number of Mapping List entries (MAPL_ENT_Ns).

MAPL_ENT_Ns describes the number of mapping list entries to follow after SOBI_GI.

The purpose of the inventive Mapping List MAPL is to provide all necessary information so that given playlist entries are efficiently translated into disc address pairs, and viceversa.

It is also possible to include Application Private Data which consist of three kinds of information, namely Application Private Data General Information, a set of one or more Application Private Data Search Pointers, and a set of one or more Application Private Data Area. If any Application Private Data exists, these three kinds of information become recorded and stored in this order in the APPLICAT.IFO file.

Stream Data include one or more Stream Objects (SOBs) each of which can be stored as a 'Program stream' as described in ISO/IEC 13818-1, Systems.

A SOB can be terminated by a program_end_code. The value of the SCR field in the first pack of each SOB may be non-zero. A SOB contains the Stream Data packed into a sequence of 'Stream Packs' (S_PCKS). Stream data can be organised as one elementary stream and are carried in PES packets with a stream_id.

Figure 4:
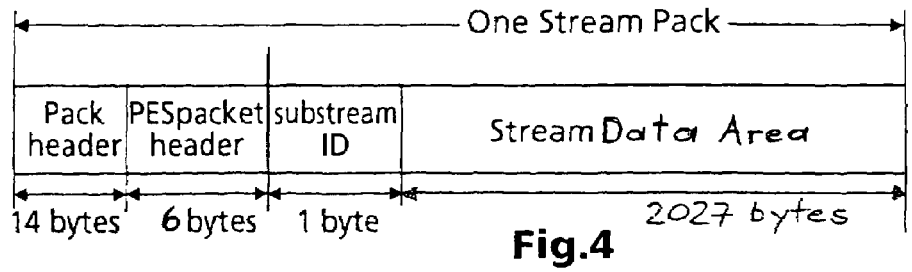
FIG. 4 a stream pack.

As shown in FIG. 4 a Stream Pack includes a 14-byte pack header and a Stream PES Packet to which a 6-byte PES packet header, a Substream ID byte and a Stream Data Area belongs. The Stream Data Area is headed by a 9-byte Application Header and optionally by an Application Header Extension, whereby the remaining part is the Application Packet Area. A Stream Object is composed of one or more Stream Packs.

Figure 5:
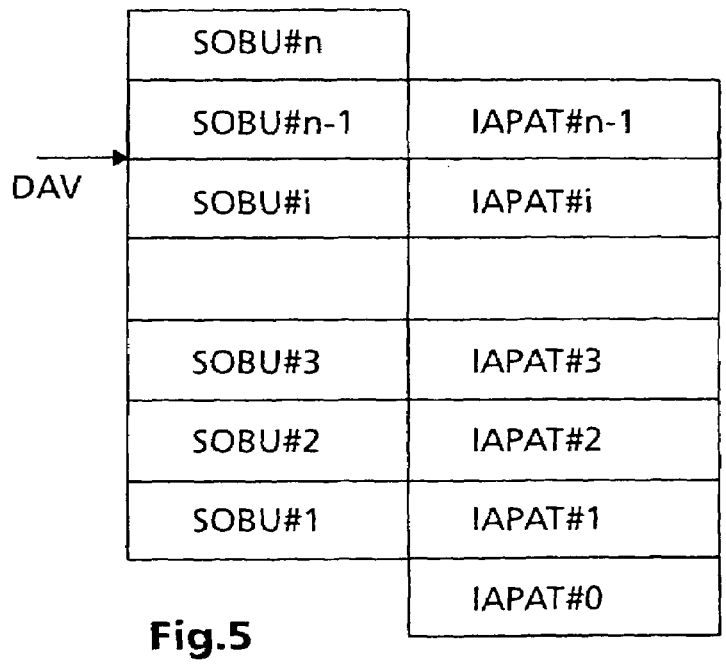
FIG. 5 inventive mapping list.

The MAPL table depicted in FIG. 5 contains n pieces or SOBUs SOBU#1 to SOBU#n of the bitstream to be recorded or of the recorded bitstream. To SOBU#1 to SOBU#n−1 a corresponding Incremental Application Packet Arrival Time entry IAPAT#1 to IAPAT#n-1 is assigned. DAV denotes a desired address or target address in the bitstream. SOBU#1 to SOBU#n each concern a constant number of bits of the bitstream.

Figure 6:
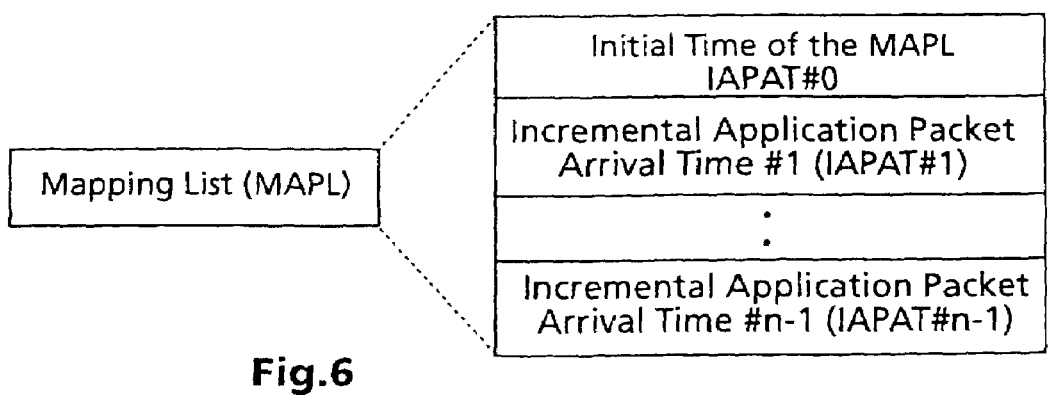
FIG. 6 structure of this mapping list.

As shown in FIG. 6, the Mapping List includes the Initial Time of the MAPL IAPAT#0 and zero or more instances of "Incremental Application Packet Arrival Time" (IAPAT).

|  | Contents | Number of Bytes |
|---|---|---|
| (1) IAPAT | Incremental APAT | 2 |
|  | Total | 2 |

Figure 9:
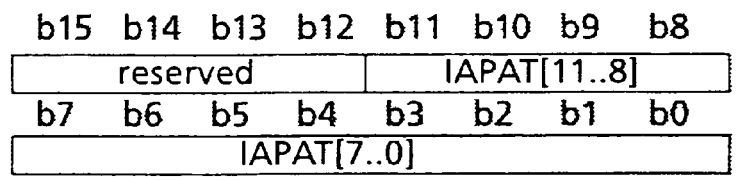
FIG. 9 IAPAT structure.

The structure of the IAPAT value is depicted in FIG. 9. IAPAT describes the Incremental Application Packet Arrival Time of the corresponding Stream Object Unit in DVD Stream Recording's Incremental PAT Describing Format defined below.

For an explanation on how to calculate IAPAT(i) during recording, the following notations will be used:

For abbreviation, M shall denote the number of Mapping List entries MAPL_ENT_Ns.

SOBU_S_APAT(i) ($1 \leq i \leq M$) shall denote the start Application Packet Arrival Time of the Stream Object Unit #i of the Stream Object, i.e. the packet arrival time of the first packet belonging to the Stream Object Unit #i. SOBU_S_APAT(1) shall be equal to the Application Time Stamp of the first Application Packet of Stream Object Unit #1 of the Stream Object.

IAPAT(0) shall denote the initial value for the Mapping List.

IAPAT(i) shall denote the i-th entry of the Mapping List, i.e. IAPAT(0) is the first and IAPAT(M−1) is the last entry of the Mapping List.

SUM_IAPAT(i) shall denote the summation of the IAPATs from 0 to i (i<M)

$$SUM\_IAPAT(i) = IAPAT(0) + IAPAT(1) + \ldots + IAPAT(i) \quad (eq\ 1)$$

with SUM_IAPAT(−1)=0.

Then IAPAT(i) shall be chosen such that IAPAT(i)=

$$floor(SOBU\_S\_APAT(i+1)/2^{MTU\_SHFT}) - SUM\_IAPAT(i-1) \quad (eq\ 2)$$

for i=0, 1, 2, . . . , M−1.

The IAPAT value range is limited by the resolution (12 bit) of an IAPAT value and its minimum value (IAPAT(i)=1 for i>0 and IAPAT(0)=0):

$$0 \leq IAPAT(0) < 2^{12} \quad (eq\ 3)$$

and $$1 \leq IAPAT(i) < 2^{12} \text{ for } i > 1 \quad (eq\ 4)$$

The floor function floor(x) rounds down, e.g. floor(1.2) =floor(1.8)=1, floor(−1.2)=floor(−1.8)=−2.

SOBU_S_APAT(i) is described in the DVD Stream Recording PAT Describing Format. But, in evaluating the equations above they must be treated as if they were 6 byte unsigned integer values.

Figure 7:
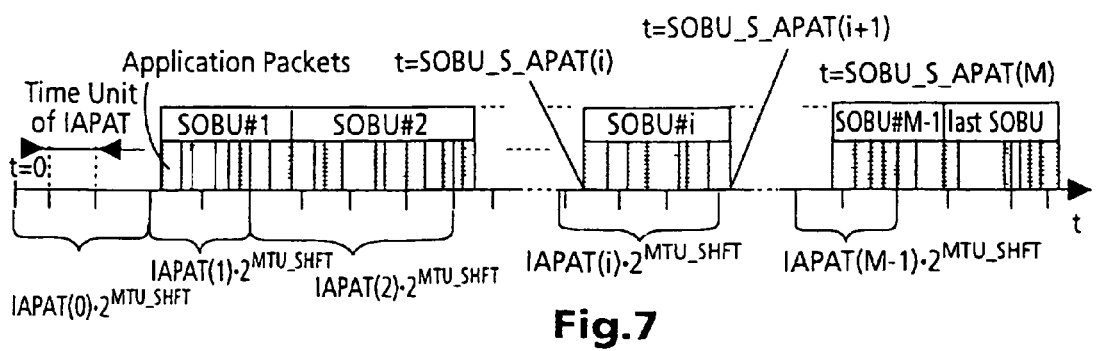
FIG. 7 mapping list example.

FIG. 7 shows, along the time axis, an example of the order of SOBU, SOBU_S_APAT and IAPAT. The left side of the time axis is divided into 'Mapping Time Units' and the right side of the time axis shows the SOBUs.

Mapping Time Unit is a duration corresponding to IAPAT=1, and can be calculated as $$\text{Mapping Time Unit} = (2^{(MTU\_SHFT-9)}/90000) \text{ seconds} \quad (eq\ 5)$$

For MTU_SHFT=18 bit it corresponds to approx. 5.69 milliseconds.

SOB_S_APAT describes the start Application Packet Arrival Time of a Stream Object, i.e. the packet arrival time of the first packet belonging to the SOB. SOB_S_APAT is described below in the DVD Stream Recording PAT Describing Format: PATs consist of a base part and an extension part. The base part holds the so-called 90 kHz unit value, and the extension part holds the less significant value measured in 27 MHz units.

(a) Choosing SOB_S_APAT for a New Recording

A newly recorded SOB will normally start with the first Application Packet of a SOBU. In this case, SOB_S_APAT and the Application Timestamp of the first Application Packet of the SOB will normally be set to 0.

(b) Calculation of SOB_S_APAT After Editing

After editing, e.g. deleting the start of a SOB, SOB_S_A-PAT, the Application Timestamp of the first Application Packet of the first SOBU of the SOB and the Application Timestamp of the first Application Packet belonging to the SOB may differ and may be not equal to 0.

All possible cases are covered by the following general definition of SOB_S_APAT:

let $ats_e$ be the 30-bit Application Timestamp of the first Application Packet belonging to the SOB and let N be the number of all Application Timestamp wrap-arounds occuring between the 30-bit Application Timestamp of the first Application Packet starting in the first SOBU of the SOB and $ats_e$, i.e. $0 \leq N \leq 1$, then $$SOB\_S\_APAT[MTU\_SHFT+11 \ldots 0] = ats_e[MTU\_SHFT+11 \ldots 0]$$

$$SOB\_S\_APAT[47 \ldots MTU\_SHFT+12] = N$$

With this definition of SOB_S_APAT, the APAT of the first Application Packet starting in the first SOBU of the SOB is equal to or greater than 0 and less than 2 MTU_SHIFT+12.

Figure 10:
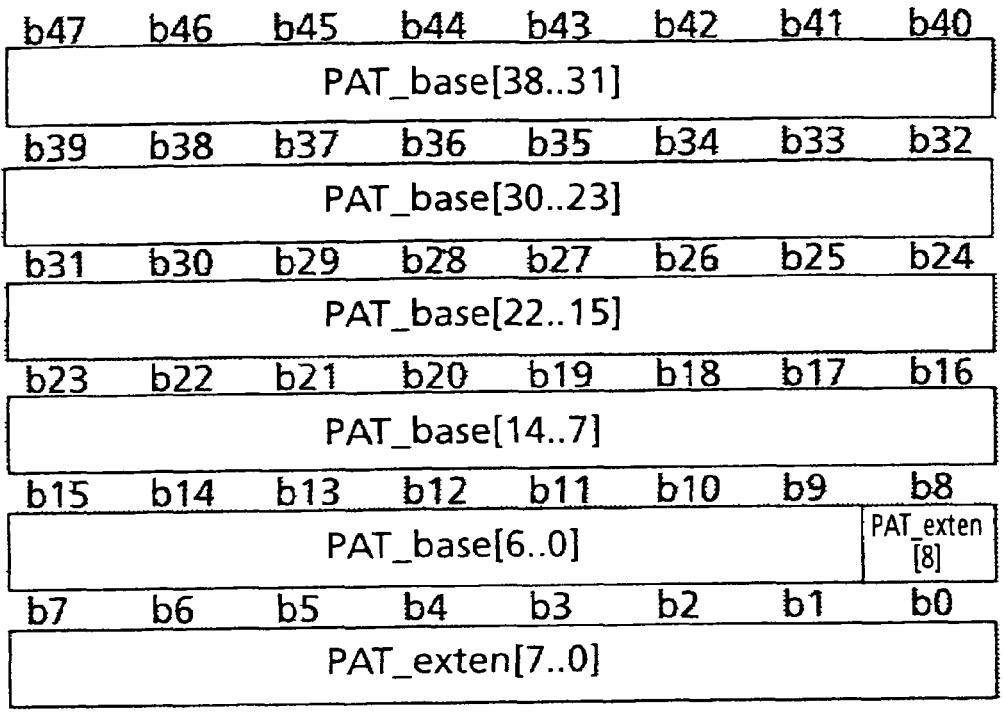
FIG. 10 APAT and PAT structure.

FIG. 10 shows the DVD Stream Recording PAT Describing Format. The variables in this figure are defined as follows:

PAT_base: PAT's base value measured by 90 kHz unit

PAT_exten: PAT's extension value measured by 27 MHz unit $$(0 \leq PAT\_exten < 300)$$

PAT in seconds=(PAT_base/90000 Hz)+(PAT_exten/ 27000000 Hz)

For an unique representation of times, PAT_exten must be in the range of $0 \leq PAT\_exten<300$. Together, PAT_base and PAT_exten cover a range of more than 1696 hours.

SOB_E_APAT describes the end Application Packet Arrival Time of the Stream Object, i.e. the packet arrival time of the last packet belonging to the SOB, in the DVD Stream Recording PAT Describing Format. The general definition of SOB_E_APAT is as follows:

let $ats_e$ be the 30-bit Application Timestamp of the last Application Packet belonging to the SOB and let N be the number of all Application Timestamp wrap-arounds occuring between the 30-bit Application Timestamp of the first Application Packet starting in the first SOBU of the SOB and $ats_e$, i.e. $N \geq 0$, then $$SOB\_E\_APAT[MTU\_SHFT+11 \ldots 0] = ats_e[MTU\_SHFT+11 \ldots 0]$$

$$SOB\_E\_APAT[47 \ldots MTU\_SHFT+12] = N$$

The Application Time Stamp (ATS) in front of each Application packet consists of a 30-bit value. An ATS includes a base part and an extension part. The base part holds the so-called 90 kHz unit value, and the extension part holds the less significant value measured in 27 MHz units.

Figure 11:
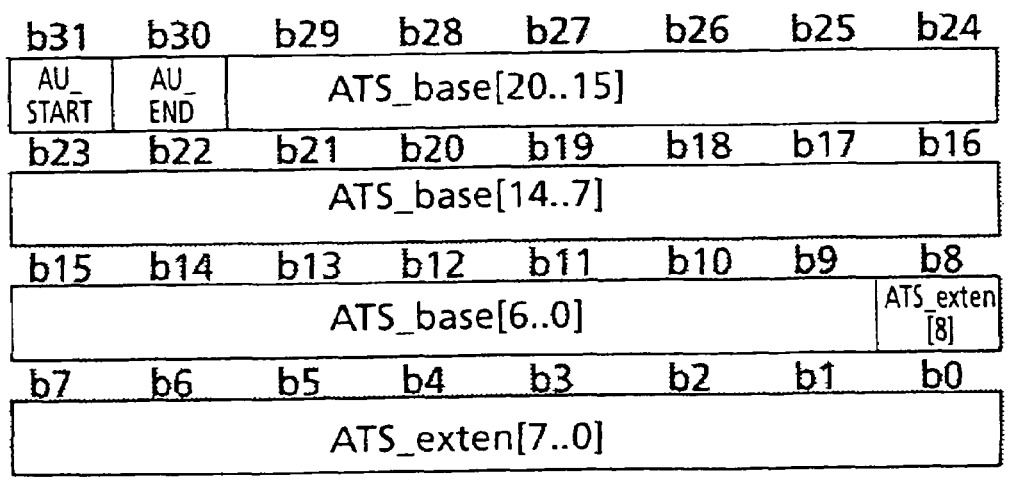
FIG. 11 ATS structure.

FIG. 11 depicts the DVD Stream Recording Application Time Stamp Describing Format. The variables in this figure are defined as follows:

AU_START when set to '1', indicates that the associated Application Packet contains a random access entry point (start of a random access unit) into the stream AU_END when set to '1', indicates the associated Application Packet is the last packet of a random access unit ATS_base base value of ATS measured in 90 kHz units ATS_exten extension value of ATS measured in 27 MHz units ATS in seconds=(ATS_base/90000 Hz)+(ATS_exten/27000000 Hz)

For a unique representation of times, ATS_exten must be in the range of $0 \leq ATS\_exten<300$. Together, ATS_base and ATS_exten cover a range of more than 23 seconds.

Figure 8:
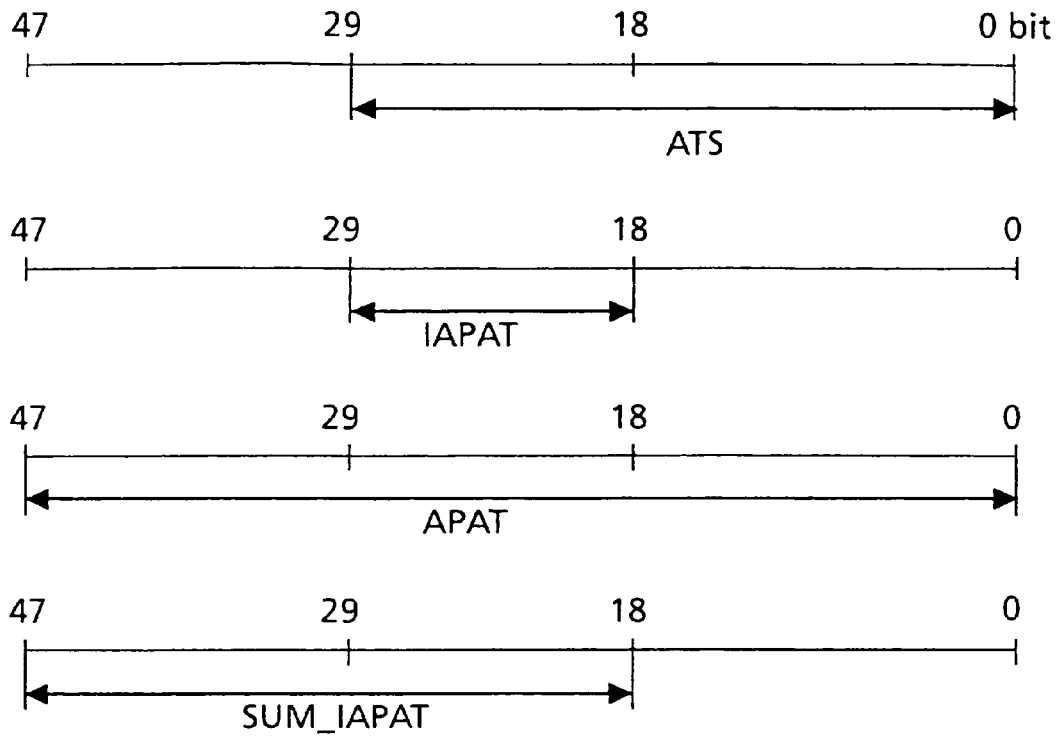
FIG. 8 comparison of several time values.

FIG. 8 depicts the value ranges of ATS, IAPAT and SUM_IAPAT with respect to the 48-bit range of APAT. ATS covers bits 0 to 29. IAPAT covers bits 18 to 29. SUM_IAPAT covers bits 18 to 47.

A significant advantage of the invention is that the mapping list generates timestamps SUM_IAPAT of which the 12 LSB bits No. 18 to 29 are identical to the 12 MSB bits No. 18 to 29 of the stream timestamps ATS. This feature allows to simplify the real-time recorder hardware.

Example Function for Scanning the Presentation Data Until the Desired Application Packet is Found The following function describes how to scan Presentation Data in order to retrieve an individual application packet associated with a Packet Arrival Time 'x'. Thereby the Mapping List and the access to it is described in more detail, e.g. internal intermediate values which are required in subsequent steps, see FIGS. 5, 6 and 7. The main result of Mapping List access is the Sector offset SOFF, indicating where the scanning starts. The complete scanning will be carried out inside a given SOB.

Notes on nomenclature used:

x48 is a 6-byte APAT value which is indicated below by '48'.

The value '30' attached to other variables indicates that they consist of 30 bits, e.g. Application Time Stamp ATS.

IAPAT(0), IAPAT(1), . . . denote the entries of the Mapping List.

The form var[a . . . b] denotes the bit field between and including bits a and b of the variable var.

'[i . . . k]' denotes bits i to k of a binary number, i=MSB, k=LSB.

'/* . . . */' denotes explanatory comments.

In order to simplify the example it is assumed that each sector contains an integer number of at least one application packet(s).

Function get_application_packet_location (x48)
a) sum_iapat48=IAPAT(0)*$2^{MTU\_SHIFT}$; k=1
b) ss48=IAPAT(k)*$2^{MTU\_SHIFT}$
c) if (sum_iapat48+ss48)[47 . . . 18]$\leq$x48[47 . . . 18], then go to g)
d) sum_iapat48=sum_iapat48+ss48
e) k=k+1
f) if k<MAPL_ENT_Ns, then go to b)
g) soff=(k−1)*SOBU_SZ /* sector offset of SOBU#(k) relative to the 1st SOBU of the SOB */
h) offset48[47 . . . 30]=sum_iapat48[47 . . . 30]
i) offset48[29 . . . 0]=0
j) current_ats30=0;
k) ap_no=1 /* Number of AP within Sector, $1 \leq ap\_no \leq AP\_Ns$ */
l) previous_ats30=current_ats30
m) current_ats30=(ATS of the application packet #ap_no of sector #soff)
n) if previous_ats30 is greater than current_ats30, then offset48=offset48+$2^{30}$/*handle ATS wrap around */
o) if current_ats30+offset48=x48 then go to s) /*target found!*/
p) if sector #soff contains at least one more application packet start, then ap_no=ap_no+1 go to m)
q) soff=soff+1
r) go to k)
s) end of function The desired application packet is now retrieved as packet #ap_no of sector #soff. A value of ap_no=1 denotes the first Application Packet starting in the Sector. A value of soff=0 denotes the first Sector of the first SOBU of the SOB.

The above function is a more general example. It can be simplified if MTU_SHFT<19. This requirement is fulfilled because MTU_SHFT is defined as 18.

a) sum_iapat30=IAPAT(0); k=1
b) sum_iapat30=sum_iapat30+IAPAT(k)
c) if sum_iapat30$\geq$x48[47 . . . 18], then go to f)
d) k=k+1
e) if k<MAPL_ENT_Ns, then go to b)
f) soff=(k−1)*SOBU_SZ /* sector off-set of SOBU #(k) relative to the 1st SOBU of the SOB */
g) ap_no=1 /* number of AP within Sector, $1 \leq ap\_no \leq AP\_PKT\_Ns$ */
h) if (ATS of the application packet #ap_no of sector #soff) equal to x48[29 . . . 0], then go to 1) /* target found!*/
i) if sector #soff contains at least one more application packet start, then ap_no=ap_no+1 go to h)
j) soff=soff+1
k) go to g)
l) end of function The desired application packet is now retrieved as packet #ap_no of sector #soff. A value of ap_no=1 denotes the first Application Packet starting in the Sector. A value of soff=0 denotes the first Sector of the first SOBU of the SOB.

The 30 bits of ATS have the same weight as the 30 LSBs of APAT.

It is not required that the first sector of the first SOBU of a SOB belongs to this SOB. If the first part of a SOB was erased, then the remaining SOB may start in the middle of a SOBU, i.e. the first sector of this SOBU is not part of the SOB.

In Stream recording, the application performs its own padding, so that the pack length adjustment methods of DVD-ROM Video or DVD-VR need not to be used. In Stream recording it is safe to assume, that the Stream packets will always have the necessary length.

The data stream also contains application time stamps ATS, e.g. within the data packets.

What is claimed is:

1. A method for addressing a bitstream being recorded on a storage medium comprising the steps of:
   using an address table corresponding to pieces of said bitstream, wherein each said piece of bitstream includes a constant amount of bits and said pieces contain data packets which include an application time stamp,
   assigning a delta time duration values to an entry within said address table, said entries having index values running from 1 to at least n-1, wherein said delta time duration value represents a difference in arrival times between a first data packet of a corresponding piece of said bitstream and a first data packet of a next piece of said bitstream, and said address table contains an initial time value that is not assigned to any of said pieces,
   accumulating said initial time value and all of said delta time duration values up to an entry for a nearest piece of said bitstream corresponding to a desired time value in order to set an address value corresponding to said desired time value on said storage medium, wherein said index for said delta time duration value entry related to said nearest piece of said bitstream is multiplied by said constant bit amount in order to compute said address value,
   selecting said initial time value such that bits of said delta time duration values correspond in weight to a corresponding number of a most significant bits of said application time stamps.

2. The method according to claim 1, wherein said storage medium is a Streamer device or a Digital Versatile Disk (DVD) recorder.

3. The method according to claim 1, wherein the size of a piece corresponds to the number of bits Of an Error Correction Code (ECC) block or a multiple thereof.

4. The method according to claim 1, wherein said initial time value corresponds to at least one of the most significant bits of the application time stamp of the first data packet of the first piece which is described by said address table.

5. The method according to claim 1, wherein said address table is a mapping list.

6. The method according to claim 1, wherein the data packet arrival times used for calculating said delta time duration values are application time stamps of corresponding ones of said data packets rounded down by setting least significant bits of said application time stamps to zero.

* * * * *